United States Patent [19]

Sawamoto et al.

[11] Patent Number: 5,318,835
[45] Date of Patent: Jun. 7, 1994

[54] PRESSURE-SENSITIVE ADHESIVE TAPE

[75] Inventors: Akira Sawamoto, Neyagawa; Kiichi Ito, Sakai; Masakazu Komemushi, Hirakata, all of Japan

[73] Assignee: Konishi Company, Ltd., Osaka, Japan

[21] Appl. No.: 918,212

[22] Filed: Jul. 21, 1992

[51] Int. Cl.$^5$ .......................... B32B 7/12; C08F 8/00
[52] U.S. Cl. .............................. 428/317.7; 428/317.3; 428/355; 525/100; 525/101
[58] Field of Search ................. 428/355, 317.3, 317.7, 428/319.9, 343; 525/101, 100

[56] References Cited

U.S. PATENT DOCUMENTS

| | | | |
|---|---|---|---|
| 4,397,906 | 8/1983 | Nakagawa et al. | 428/355 X |
| 4,463,115 | 7/1984 | Hirose et al. | 524/188 |
| 4,593,068 | 6/1986 | Hirose et al. | 525/101 |
| 4,735,829 | 4/1988 | Hirose et al. | 525/101 |
| 4,965,127 | 10/1990 | Ebe et al. | 428/343 |
| 4,968,559 | 11/1990 | Kuroda et al. | 428/354 |
| 4,975,488 | 12/1990 | Furukawa et al. | 525/101 |
| 4,997,656 | 3/1991 | Shikinami et al. | 424/449 X |

FOREIGN PATENT DOCUMENTS 59-74149 4/1984 Japan.
62-39646 2/1987 Japan.
62-48785 3/1987 Japan.
62-129375 6/1987 Japan.
63-63750 3/1988 Japan.
63-270784 11/1988 Japan.
3-122175 5/1991 Japan.

Primary Examiner—George F. Lesmes
Assistant Examiner—Blaine Copenheaver
Attorney, Agent, or Firm—Hopkins & Thomas

[57] ABSTRACT

Disclosed is a pressure-sensitive adhesive tape comprising: a sheet backing composed of polybutadiene foam having a substantially closed cell foam structure; and a layer of pressure-sensitive adhesive composition provided on a surface of the sheet backing. The pressure-sensitive adhesive composition in the present invention comprises: (A) an acrylic copolymer prepared from a mixuture composing: (i) at least one acrylic ester monomer having an alkyl radical containing, on average, 4 to 12 carbon atoms as an alcohol residue; and (ii) polymerizable unsaturated carboxylic acid monomer; (B) a polymer having a hydrolyzable silicon-containing radical; and (C) a polyfunctional isocyanate compound. The adhesive composition of the present invention needs no silanol condensation catalyst.

15 Claims, No Drawings

PRESSURE-SENSITIVE ADHESIVE TAPE

BACKGROUND OF THE INVENTION

1. Field of the Invention

The present invention relates to a pressure-sensitive adhesive tape, in particular, to an adhesive tape in which a pressure-sensitive adhesive layer is formed on a foam backing tape.

2. Description of the Prior Art

Conventional single-coated and double-coated adhesive tapes in which an adhesive material is coated on a backing have been widely used in a variety of manners such as packaging, masking, jointing of electrical insulating materials and the like. However, when jointing structural materials made of metal, plastic, wood, gum or the like, especially the rough or irregular surfaces of such materials, adhesive tapes in which pressure-sensitive adhesive material is coated on a foam backing are more advantageous, since elasticity of the foam enables the adhesive layer to adapt easily to the irregular surface.

For the foam backing, urethane foam sheeting, polyethylene foam sheeting, chloroprene rubber foam sheeting, foam sheeting made of synthetic resins such as polyvinyl chloride, polyviniyl acetate and the like have been commonly used. Nevertheless, these products have some disadvantages. Specifically, urethane foam backing is poor in resistance to weathering and the like. Similarly, with respect to polyethylene foam, polyvinyl chloride foam, polyvinyl acetate foam and the like, it is difficult to obtain a satisfactory material which sufficiently contains all the properties of stress relaxation, flexibility, extensibility and breaking strength. In particular, when polyvinyl chloride foam is employed as the backing, some problems are caused by the migration of plasticizer.

On the other hand, elastomeric gum adhesives and acrylic adhesives are commonly used for the pressure-sensitive adhesive which is coated on or impregnated into the backing. The gum adhesive primarily contains natural or synthetic rubber and is blended with tackifier resin and the like. On the other hand, the acrylic adhesives are obtained by copolymerization of a monomer mixture which contains an acrylate ester monomer as a main component and a polar monomer such as acrylic acid or the like. Of these materials, elastomeric gum adhesives are excellent in tackiness at low temperatures. Nevertheless, they are poor in resistance to weathering, heat and solvent attack. Therefore, acrylic adhesives have been used more popularly as an adhesive material for foam-backing tapes, except for some special cases.

Due to tendency in the mean value and distribution range of the molecular weight of the obtainable polymer molecules, the acrylic adhesive frequently lacks in cohesion. Therefore, in general manufacturing processes, the acrylic copolymer after copolymerization is further subjected to treatment with a crosslinking agent as which isocyanate compounds, epoxy compounds, polyamine compounds, melamine compounds, phenolic compounds, organic metal compounds and the like are well-known in the industrial field. By such a method, it is possible to improve the cohesive strength of the acrylic adhesives. However, even when the cohesive strength is raised by crosslinking treatment, tackiness at low temperatures and the initial tack of the acrylic adhesive deteriorates in accordance with increased crosslink density. On the contrary, if crosslink density is decreased, resistance to heat and solvent attack fails. Therefore, it is difficult to balance the various properties of the acrylic adhesive in a beneficial manner by regulation of crosslink density.

In other words, prior adhesive tapes have a problem to be solved in that all the properties of stress relaxation, flexibility, extensibility and breaking strength cannot be sufficiently imparted to the backing material at the same time, and also in that the pressure-sensitive adhesive material cannot demonstrate uniform excellence in cohesive strength, initial tack, tackiness at low temperatures and resistance to heat and solvent attack.

SUMMARY OF THE INVENTION

With these problems in mind, it is an object of the present invention to provide a novel pressure-sensitive adhesive tape having a backing which is excellent totally in stress relaxation, flexibility, extensibility and breaking strength.

It is another object to provide a pressure-sensitive adhesive tape having an pressure-sensitive adhesive layer which concurrently provides satisfactory levels of cohesive strength of the adhesive layer, initial tack, tackiness at low temperature and resistance to heat and solvent attack at the same time.

In order to achieve the above-mentioned object, a pressure-sensitive adhesive tape according to the present invention comprises: a sheet backing composed of polybutadiene foam having a substantially closed cell foam structure; and a layer of pressure-sensitive adhesive composition provided on a surface of the sheet backing.

Another pressure-sensitive tape according to the present invention comprises: a sheet backing composed of a foam material; and a layer of pressure-sensitive adhesive composition formed on a surface of the sheet backing, the pressure-sensitive adhesive composition comprising: (A) an acrylic copolymer prepared from a mixture comprising (i) at least one acrylic ester monomer having an alkyl radical containing, on average, 4 to 12 carbon atoms as an alcohol residue; and (ii) polymerizable unsaturated carboxylic acid monomer; (B) a polymer having a hydrolyzable silicon-containing radical; and (C) a polyfunctional isocyanate compound.

DETAILED DESCRIPTION OF THE PREFERRED EMBODIMENTS

According to research conducted by the inventors of the present invention, it is known that polybutadiene foam is suitably advantageous for use as a backing material to achieve the pressure-sensitive adhesive tape according to the present invention.

Moreover, it is also known that, for the pressure-sensitive adhesive tape, a suitable adhesive composition comprises the following: (A) an acrylic copolymer of acrylic ester monomer and polymerizable unsaturated carboxylic acid monomer; and (B) a polymer having a hydrolyzable silicon-containing radical.

The detailed description with regard to each of the backing materials and the adhesive composition of the pressure-sensitive adhesive tape according to the present invention will follow.

In the present invention, the pressure-sensitive adhesive can be coated on a polybutadiene foam sheet backing. The polybutadiene foam is preferably produced by polymerization of butadiene monomer and subsequent cross-linking of the obtained polymer before closed-cell foaming. In particular, closed-cell polybutadiene foam having a density of 0.05 to 0.50 g/cm$^3$ is suitable, and more preferably, the density of the foam can be regulated within a range of 0.10 to 0.30 g/cm$^3$. If the foam density is less than 0.05 g/cm$^3$, breaking strength of the foam is insufficient. Accordingly, when jointing non-elastic objects such as metals and the like, a foam of less than density 0.05 g/cm$^3$ is disadvantageous in that the shear strength of the foam may not be sufficient enough to bear the shearing force which acts on the adhesive tape. On the contrary, if the density exceeds the value 0.50 g/cm$^3$, the foam lacks flexibility. Accordingly, such a foam cannot adapt well to rough surfaces, nor can expect to effect stress relaxation.

The foam materials can be generally classified into two types according to their foam structure, namely, into a type of an open-cell structure and that of a closed-cell structure. If an open-cell type foam material is used as a backing, the adhesive tape obtained is poor in elasticity and easily makes a break near the cells. Moreover, use of open-cell foam material cannot impart sufficient resistance to humidity and water to the adhesive tape. In the present invention, substantial closed-cell polybutadiene foam in which a closed-cell ratio lies within a range of about 80 to 100% by volume can be preferably utilized.

Next, an adhesive composition employed for the pressure-sensitive adhesive tape according to the present invention preferably comprises (A) an acrylic copolymer of: at least one acrylic ester monomer having an alkyl radical which serves as the alcohol residue and which contains, on average, 4 to 12 carbon atoms; and a polymerizable unsaturated carboxylic acid monomer, (B) a polymer having a hydrolyzable silicon-containing radical, and (C) a polyfunctional isocyanate compound. Relative to 100 parts by weight of acrylic copolymer (A), the amount of polymer (B) is preferably defined within a range of 1 to 50 parts by weight, and that of the isocyanate compound (C) is preferably 0.1 to 5 parts by weight. Moreover, as required by the situation, the adhesive composition may further contain tackifier resin (D), the preferred amount of the added tackifier resin being equal to or less than 100 parts by weight relative to 100 parts by weight of acrylic copolymer (A).

The components (A), (B), (C) and (D) of the adhesive composition according to the present invention will be described in more detail below.

The acrylic copolymer (A) according to the present invention refers to a copolymer obtained by polymerization of a monomer mixture containing: (i) at least one acrylic ester monomer having an alkyl radical containing, on average, 4 to 12 carbon atoms as the alcohol residue; and (ii) a polymerizable unsaturated carboxylic acid monomer. The acrylic ester monomer (i) is preferably blended at a content of 55 to 95 parts by weight relative to 5 to 15 parts by weight of the carboxylic acid monomer (ii). Moreover, as necessity arises, the mixed monomer for copolymerization may further contain another copolymerizable monomer (iii) at the content of not more than 30 parts by weight.

The acrylic ester monomer (i) mentioned above can include various alkyl acrylate monomers and alkyl methacrylate monomers, and a simple monomer or mixture of a plurality of different monomers can be utilized. The alcohol residue can be selected preferably so that the number of carbon atoms in the acrylate ester or methacrylate ester lies within a range of 4 to 12. If a plurality of acrylate monomers or methacrylate monomers in which different alcohol residues are included are used, the alcohol residues or alkyl radicals should be selected appropriately so that the average value of the number of carbon atoms contained in each monomer molecule of the ester monomers lies in the above-described range. Preferred examples of the alkyl radical are, for example, n-propyl, iso-propyl, n-butyl, sec-butyl, ter-butyl, n-octyl, iso-octyl, 2-ethylhexyl, dodecyl and the like.

In the acrylic copolymer (A), it should be noted that the monomer mixture for copolymerization contains unsaturated carboxylic acid monomer (ii), that is, a free carboxylic acid component, or non-esterificated carboxylic acid radical. Addition of the unsaturated carboxylic acid monomer (ii) increases the compatibility between the acrylic copolymer (A) and the polymer (B) containing a hydrolyzable silicon-containing radical. Moreover, the carboxylic acid component can also enhance the reactivity of the hydrolyzable silicon-containing radical of the polymer (B), details of which will be described hereinafter. Namely, in spite of the ordinary requirement of a silanol condensation catalyst to condense the compounds containing a hydrolyzable silicon-containing radical, the adhesive composition of the present invention needs no silanol condensation catalyst due to the presence of the free carboxylic acid component in the acrylic copolymer. Cohesion of the pressure-sensitive adhesive composition can be sufficiently increased even without the catalyst. In addition, the adhesive composition containing no silanol condensation catalyst according to the present invention is rather superior to the ordinary catalyst-containing adhesive compositions in that initial tackiness and adhesion are excellent. However, it should be noted that the amount of the unsaturated carboxylic acid monomer (ii) has a particular range suitable for the adhesive. If the amount of the unsaturated carboxylic acid (ii) is less than 5 parts by weight, compatibility between the silicon-containing polymer (B) and the acrylic copolymer (A) is not sufficient, and cohesiveness of the adhesive composition is low. Accordingly, adhesive properties cannot be suitably developed. On the other hand, if the content of unsaturated carboxylic acid (ii) exceeds 15 parts by weight, stability of the acrylic copolymer (A) is lost. At the same time, tackiness which must be imparted to the obtained adhesive composition essentially by acrylic copolymers is not achieved, thereby leading to insufficient levels of initial tackiness, tackiness at low temperatures and adhesion.

With respect to the polymerizable unsaturated carboxylic acid monomer (ii), preferred examples are, for example, acrylic acid, methacrylic acid, crotonic acid, iso-crotonic acid, itaconic acid, maleic acid, fumaric acid and the like. However, any other polymerizable carboxylid acid compounds may be used as well.

Similarly, illustrated are methyl acrylate, methyl methacrylate, ethyl acrylate, ethyl methacrylate, stylene, vinyl acetate, acrylonitrile, methacrylonitrile, acrylamide, methacrylamide, vinyl propyonate and the like are preferred examples of the other copolymerizable monomer (iii).

The acrylic copolymer (A) can be prepared, in accordance with an ordinary solution polymerization method, by mixing the acrylate (i) with the unsaturated carboxylic acid (ii), adding the other polymerizable monomer (iii) as required, and copolymerizing the mixture in the presence of a radical polymerization initiator.

Addition of polymer (B) having a hydrolyzable silicon-containing radical improves cohesiveness of the adhesive composition in accordance with condensation between the silicon-containing radicals. Various compounds having a silicon-containing radical such as alkoxysilyl radicals, halosilyl radicals and the like can be used for the above-mentioned aim as the occasion arises. These silicon-containing radicals, which produce silanol radicals by hydrolyzing in a humid condition and the like, must be condensed by using a silanol condensation catalyst such as tin, some tin-containing compounds and the like anyway. By contrary, in the present invention, the hydrolyzable silicon-containing radicals in the mixture react suitably in the presence of the carboxylic acid radical of the component (ii) described above. Therefore, the polymer (B) having a hydrolyzable silicon-containing radical in the present invention does not require an ordinary silanol condensation catalyst.

The hydrolyzable silicon-containing radical in the present invention can include a radical which contain a silicon atom bonded with a hydrogen atom, a halogen atom, an alkoxy radical, an acyloxy radical, a ketoxymate radical, an amino radical, an aminoxy radical, an amide radical, an alkenyloxy radical, a mercapto radical or the like, and, radicals containing a silicon atom bonded with an alkoxy-radical are especially suitable.

Molecular weight of the polymer (B) preferably lies within a range of about 300 to 30,000, and the hydrolyzable silicon-containing radical may be either a branched radical from the main chain or a radical connected to a terminal part of the polymer chain. With respect to the main chain of the polymer (B), alkylene oxide chains are most preferable in view of pliability for use as adhesive. However, polymer chains causing stiffness such as acrylic chains, urethane chains and the like are also usable, provided that the amount of the polymer (B) to be added is regulated so as not to lose pliability of the adhesive composition.

If the amount of added polymer (B) having a hydrolyzable silicon-containing radical exceeds 50 parts by weight relative to 100 parts by weight of the acrylic copolymer (A), cohesiveness of the adhesive composition becomes too high, while, on the other hand, even further addition causes deterioration of the cohesiveness. In this way, when using polymer (B), if a suitable amount is not utilized, a preferable adhesive composition cannot be obtained.

A few methods of preparing a polymer having a hydrolyzable silicon-containing radical are disclosed in Japanese Laid-Open Patent Publication (Kohkai) No. 55-56153, Japanese Laid-Open Patent Publication (Kohkai) No. 59-74149, Japanese Laid-Open Patent Publication (Kohkai) No. 60-215089, Japanese Laid-Open Patent Publication (Kohkai) No. 61-60771 and Japanese Laid-Open Patent Publication (Kohkai) No. 62-129375, and these methods can be used for preparation of polymer (B) according to the present invention. In these references, a polymer having a silicon-containing radical or one mixed with a tackifier resin component is condensed by using a silanol condensation catalyst to obtain an adhesive composition. Using these disclosed methods, it takes a long time to accomplish the condensation reaction when manufacturing adhesive tapes. Moreover, another defect is illustrated in that silicone-coated release paper, which has been generally used for adhesive tapes, cannot be applied to the adhesive composition obtained by the above-referenced methods. On the other hand, in this connection, silicone-coated release paper can be applied to the adhesive composition according to the present invention, even though a polymer having a silicon-containing radical is utilized. Moreover, the time required for the condensation reaction is not long.

Addition of the polyfunctional isocyanate compound (C) works for improving cohesiveness of the adhesive composition. However, since an excessive amount of the isocyanate compound (C) increases hardness of the adhesive composition, it is therefore preferred that the amount of isocyanate compound (C) be limited within a range of 0.1 to 5 parts by weight relative to 100 parts by weight of acrylic copolymer (A). Illustrated examples of the preferred isocyanate compound (C) are, for example, 2,4-and 2,6-tolylene diisocyanate, diphenylmethane-4,4'-diisocyanate, hexamethylene-1,6-diisocyanate, isophorone diisocyanate, hydrogenated diphenylmethane diisocyanate, hydrogenated xylene diisocyanate, lysine triisocyanate, adduct compounds thereof, a prepolymer having isocyanate terminals and the like. Other polyisocyanate compounds may be utilized as well.

In addition to the components described above, tackifier resin (D) can be introduced into the adhesive composition according to the present invention as necessity arises, in order to control tackiness properties of the composition. Illustrated examples of the preferred tackifier resin (D) are, for example, resins having a polar radical such as rosin ester gum, phenolic resin, xylene resin, xylene phenol resin, terpene phenol resin and the like; aromatic resins which have relatively small polarities; various petroleum resins such as a copolymer of an aliphatic acid monomer and an aromatic monomer, a polymer of an alicyclic monomer and the like; coumarone-indene resin; low molecular weight polystyrene resin; polyterpene resin and the like. The tackifier resin (D) can be added at an amount no greater than 100 parts by weight relative to 100 parts by weight of the acrylic copolymer. If the amount of the tackifier resin (D) exceeds 100 parts by weight, the composition obtained loses tack, adhesiveness and the like.

For manufacturing the pressure-sensitive adhesive tape according to the present invention, the above-described components (A), (B), (C), and, if necessary, (D) are mixed uniformly, wherein the result is not affected by the order of the mixing procedure. The adhesive composition obtained above is then coated uniformly on one side of a release-coated paper or film. After drying the adhesive composition in hot air to condense the silicon-containing radicals of the polymer (B), the release paper coated with the adhesive composition layer is laminated on the polybutadiene form backing, thereby obtaining a pressure-sensitive adhesive tape. Similarly, if the other side of the backing is also laminated with a release paper coated with an adhesive alyer, a double-coated tape can be obtained.

Below, a few examples of the pressure-sensitive adhesive tape according to the present invention are described.

Samples of the adhesive composition were prepared in accordance with the preparation methods described below, and each of the sample adhesive compositions was laminated on the both side of a backing to obtain a double-sided adhesive tape of Sample Nos. 1 though 7, respectively. The adhesive tape was subjected to measurement of initial tackiness, adhesive strength, adhesive strength under shear, retentivity and heat durability, in accordance with methods described below. The obtained results are shown in Table 1 and Table 2.

PREPARATION OF SAMPLES

Sample No. 1

First, 80 parts by weight of 2-ethylhexyl acrylate, 15 parts by weight of ethyl acrylate, 5 parts by weight of acrylic acid, 0.2 parts by weight of benzoyl peroxide and 120 parts by weight of ethyl acetate were charged in a reactor and reacted at a temperature of 70° to 75° C. for 4 hours while being stirred in a nitrogen air flow. The reaction temperature was then elevated to a temperature of 80° to 85° C., and the reaction mixture was further matured at this temperature for 3 hours to obtain an acrylic copolymer. The obtained acrylic copolymer had a rate of polymerization of 98%, a nonvolatile content of 44.5%, a viscosity of 10 Pa.s and a weight-average molecular weight of 550,000.

Next, 100 parts by weight of the nonvolatilizable residue obtained by evaporation treatment of the above acrylic copolymer was mixed with: 10 parts by weight of a polymer which was sold under the tradename Silyl 5A01 by Kanegafuchi Chemical Industry Co., Ltd. of 2-4, Nakanoshima 3-chome, Kita-ku, Osaka 530, Japan and was obtained from polypropyleneoxide having an average molecular weight of 8000 by bonding 84% of the polymer ends to the radical represented by formula:

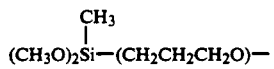

being a polymer which has a hydrolyzable silicon-containing radical; 20 parts by weight of terpene phenol resin which was sold under the tradename YS Polystar T-115 by Yasuhara Chemical Co., Ltd. of 1080, Takagi-cho, Fuchu-shi, Hiroshima 726, Japan as a tackifier resin; and 1 part by weight of polyisocyanate (sold under the tradename Colonate L by Nippon Polyurethane Industry Co., Ltd. of 2-8, Toranomon 1-chome, Minato-ku, Tokyo 105, Japan) to obtain an adhesive composition.

The above adhesive composition was coated uniformly on a silicone-coated release paper, and then dried and condensed for 3 minutes at a temperature of 80° C. by using a hot-air dryer, so that an adhesive layer having a thickness of 70 $\mu$m was formed. Two sheets of the adhesive-coated silicone release paper were, respectively, laminated onto both sides of a polybutadiene close-cell foam backing having a density of 0.2 g/cm$^3$, a thickness of 1.0 mm and a closed cell ratio of 90% by volume, and then pressed by a pressure roll to obtain a double-coated pressure-sensitive adhesive tape, Sample No. 1.

Sample No. 2

The procedure for Sample No. 1 was repeated except that the amount of ethyl acrylate added for preparation of the acrylic copolymer was 5 parts by weight and the amount of acrylic acid was 15 parts by weight, thereby obtaining an acrylic copolymer in which a nonvolatile content is 45%, a viscosity is 15 Pa.s and a weight-average molecular weight is 670,000. Using this copolymer, an adhesive composition was prepared and a double-coated adhesive tape, Sample No. 2, was manufactured therefrom in a similar manner to that of Sample No. 1.

Sample No. 3

The procedure for Sample No. 1 was repeated except that, instead of acrylic acid, the same amount of methacrylic acid was employed for preparation of the acrylic copolymer, thereby obtaining an acrylic copolymer in which a nonvolatile content is 44.8%, a viscosity is 12 Pa.s and a weight-average molecular weight is 655,000. Using this copolymer, an adhesive composition was prepared and a double-coated adhesive tape, Sample No. 3, was manufactured therefrom in a similar manner to that of Sample No. 1.

Sample No. 4

The procedure for Sample No. 1 was repeated except that, instead of acrylic acid, the same amount of crotonic acid was employed for preparation of the acrylic copolymer, thereby obtaining an acrylic copolymer in which a nonvolatile content is 44.7%, a viscosity is 12 Pa.s and a weight-average molecular weight is 620,000. Using this copolymer, an adhesive composition was prepared and a double-coated adhesive tape, Sample No. 4, was manufactured therefrom in a similar manner to that of Sample No. 1.

Sample No. 5

The procedure for Sample No. 1 was repeated except that, instead of ethyl acrylate, the same amount of vinyl acetate was employed for preparation of the acrylic copolymer, thereby obtaining an acrylic copolymer in which a nonvolatile content is 45.0%, a viscosity is 16 Pa.s and a weight-average molecular weight is 710,000. Using this copolymer, an adhesive composition was prepared and a double-coated adhesive tape, Sample No. 5, was manufactured therefrom in a similar manner to that of Sample No. 1.

Sample No. 6

The procedure for Sample No. 1 was repeated except that any component as a tackifier resin was not introduced into the preparation of the adhesive composition. Using this adhesive composition, a double-coated adhesive tape, Sample No. 6, was manufactured in a similar manner to that of Sample No. 1.

Sample No. 7

The procedure for Sample No. 1 was repeated except that the amount of ethyl acrylate added for preparation of the acrylic copolymer was 17 parts by weight and the amount of acrylic acid was 3 parts by weight, thereby obtaining an acrylic copolymer in which a nonvolatile content is 44.8%, a viscosity is 7.5 Pa.s and a weight-average molecular weight is 520,000. Using this copolymer, an adhesive composition was prepared and a double-coated adhesive tape, Sample No. 7, was manufactured therefrom in a similar manner to that of Sample No. 1.

Sample No. 8

The procedure for Sample No. 1 was repeated except that any component as a polymer having a hydrolyzable silicon-containing radical was not introduced into the preparation of the adhesive composition. Using this adhesive composition, a double-coated adhesive tape, Sample No. 8, was manufactured in a similar manner to that of Sample No. 1.

Sample No. 9

The procedure for Sample No. 1 was repeated except that the amount of the polymer having a hydrolyzable silicon-containing radical was 100 parts by weight, thereby obtaining an adhesive composition. Using this composition, a double-coated adhesive tape, Sample No. 9, was manufactured in a similar manner to that of Sample No. 1.

Sample No. 10

The procedure for Sample No. 1 was repeated except that polyisocianate was not introduced into the preparation of the adhesive composition. Using this adhesive composition, a double-coated adhesive tape, Sample No. 10, was manufactured in a similar manner to that of Sample No. 1.

Sample No. 11

The procedure for Sample No. 1 was repeated to obtain the same adhesive composition as in Sample No. 1. Next, changing the backing material to a polybutadiene foam backing having a density of 0.03 g/cm$^3$ and a closed cell ratio of 85 vol %, a double-coated adhesive tape, Sample No. 11, was manufactured in the same manner as in Sample No. 1.

Sample No. 12

The procedure for Sample No. 1 was repeated to obtain the same adhesive composition as in Sample No. 1. Next, changing the backing material to polybutadiene closed-cell foam backing having a density of 0.7 g/cm$^3$ and a closed cell ratio of 97 vol %, a double-coated adhesive tape, Sample No. 12, was manufactured in the same manner as in Sample No. 1.

Sample No. 13

The procedure for Sample No. 1 was repeated to obtain the same adhesive composition as in Sample No. 1. Next, changing the backing material to polybutadiene open-cell foam backing having a density of 0.2 g/cm$^3$ and a closed cell ratio of 15 vol %, a double-coated adhesive tape, Sample No. 13, was manufactured in the same manner as in Sample No. 1.

Sample No. 14

The procedure for Sample No. 1 was repeated to obtain the same adhesive composition as in Sample No. 1. Next, changing the backing material to polyethylene closed-cell foam backing having a density of 0.2 g/cm$^3$, a thickness of 1 mm and a closed cell ratio of 85 vol %, a double-coated adhesive tape, Sample No. 14, was manufactured in the same manner as in Sample No. 1.

Sample No. 15

The procedure for Sample No. 1 was repeated to obtain the same adhesive composition as in Sample No. 1. Next, changing the backing material to polyurethane closed-cell foam backing having a density of 0.1 g/cm$^3$, a thickness of 1 mm and a closed cell ratio of 90 vol %, a double-coated adhesive tape, Sample No. 15, was manufactured in the same manner as in Sample No. 1.

Sample No. 16

The procedure for Sample No. 1 was repeated to obtain the same adhesive composition as in Sample No. 1. Next, changing the backing material to chloroprene rubber closed-cell foam backing having a density of 0.2 g/cm$^3$, a thickness of 1 mm and a closed cell ratio of 90 vol %, a double-coated adhesive tape, Sample No. 16, was manufactured in the same manner as in Sample No. 1.

Sample No. 17

The procedure for Sample No. 1 was repeated to obtain the same adhesive composition as in Sample No. 1. Next, changing the backing material to polyvinyl chloride closed-cell foam backing having a density of 0.3 g/cm$^3$, a thickness of 1 mm and a closed cell ratio of 85 vol %, a double-coated adhesive tape, Sample No. 17, was manufactured in the same manner as in Sample No. 1.

Sample No. 18

The procedure for Sample No. 1 was repeated except that any component as a unsaturated carboxylic acid monomer was not introduced into the preparation of the adhesive composition and that 1 parts by weight of an organotin compound (sold under the tradename Sutan #918 by Sankyo Organic Synthesis Co., Ltd. of Ginza 3-chome, Chuo-ku, Tokyo 104, Japan) for a silanol condensation catalyst was added to the adhesive composition. Using this adhesive composition, a double-coated adhesive tape, Sample No. 18, was manufactured in a similar manner to that of Sample No. 1.

MEASUREMENT AND EVALUATION OF ADHESIVE PROPERTIES

Initial Tackiness

Removing the release paper from one side of a double-coated adhesive tape sample, the sample tape was applied to a flat stainless steel plate by placing the stripped adhesive surface on the plate. Then, the tape was pressed to the plate by a rubber roller with a load of 2 kgf which was rolled thereon by a cycle of to-and-fro motions. Next, another release paper was removed, and a polyester film having a thickness of 25 gm was applied to that side. Twenty minutes later, one end of the tape was pulled toward the opposite end of the tape in parallel to the adherend surface at a peel rate of 300 mm/min. At this time, peel strength at a peel angle of 180° of the sample tape was measured at a temperature of 20° C. and a humidity of 65% RH for evaluation of initial tackiness of the adhesive tape.

Adhesive Strength

A sample tape was applied and pressed to a flat stainless steel plate in the same manner as in the measurement of initial tackiness. After leaving it at rest for 168 hours, peel strength at a peel angle of 180° was measured in the same manner as in the measurement of initial tackiness for evaluation of adhesive strength of the adhesive tape.

On the other hand, another tape of the same sample was applied to a rigid polyvinyl chloride (PVC) sheet, and peel strength with respect to the rigid PVC sheet was measured in the same manner as in the above description.

Adhesive Strength under Shear

First, using a sample tape having an adhesive surface dimension of 25 mm×25 mm, a pair of stainless steel plates was jointed to one another in the same manner as in the discription of adhesive Strength. Then, after leaving it at rest for 168 hours, one of the plates was pulled along the another plate at a temperature of 20° C. and a humidity of 65% RH. Shearing force required for peeling the adhesive tape off of the stainless steel plate at this time was measured for evaluation of adhesive strength under shear.

Retentivity

After removing the release paper from both sides of a sample tape having an adhesive surface dimension of 25 mm×25 mm on each side, the adhesive tape was held between a pair of stainless steel plates. The plates were then pressed to the adhesive tape by rolling a rubber roller with a load of 2 kgf on the plates using a cycle of to-and-fro motions, and then left at rest for 168 hours. Next, raising the plates vertical in an oven, one of the plates was fixed and a load of 1 kgf was attached to and suspended from the another plate. Then, the temperature in the oven was elevated to 40° C. and maintained. In this condition, the time period before the lower plate fell off dur to breakdown of the adhesive tape was measured for evaluation of retentivity of the adhesive tape.

In addition, the same measuring procedure as in the above description was performed at an oven temperature of 60° C., and the time period before the adhesive broke was measured similarly.

Heat Durability

In the same manner as in the measurement of retentivity, a pair of stainless steel plates having the same size was arranged in an oven using the same load as above. Then, the temperature in the oven was elevated from 40° C. at a rate of 1° C./min. The temperature at which the adhesive tape broke and the lower plate fell off was measured for evaluation of heat durability.

Break Condition

In each of the above measurements, condition of the adhesive tape after peeling or breaking was observed. The results are shown in Table 1, in which a letter α denotes a break point at the boundary of the adhesive layer on the adherent, a letter β denotes cohesion failure of the backing layer, and a letter γ denotes cohesive failure of the adhesive layer.

TABLE 1

|  | Sample No. | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Initial Tackiness (N/25 mm) | 19.6 | 17.6 | 14.8 | 18.6 | 11.8 | 10.8 | 24.5 | 6.9 | 11.8 | 8.8 |
| Break Condition* | α | α | α | α | α | α | α | α | α | α |
| Adhesive Strength (N/25 mm) | | | | | | | | | | |
| Stainless Steel | 44.5 | 46.1 | 39.2 | 40.2 | 41.2 | 40.2 | 29.4 | 24.5 | 22.5 | 28.4 |
| Rigid PVC | 47.0 | 49.0 | 42.1 | 44.1 | 45.1 | 42.1 | 29.4 | 26.5 | 24.5 | 31.4 |
| Break Condition* | | | | | | | | | | |
| Stainless Steel | β | β | β | β | β | β | γ | α | α | γ |
| Rigid PVC | β | β | β | β | β | β | γ | α | α | γ |
| Adhesive Strength under Shear (N/cm$^2$) | 125.4 | 124.5 | 126.1 | 117.6 | 123.9 | 125.4 | 52.9 | 128.4 | 99.0 | 78.4 |
| Break Condition* | β | β | β | β | β | β | γ | β | α | γ |
| Retentivity (hr) | | | | | | | | | | |
| 40° C. | 24< | 24< | 24< | 24< | 24< | 24< | 0.5 | 22 | 21 | 22 |
| 60° C. | 24< | 24< | 24< | 24< | 24< | 24< | 0.2 | 15 | 9 | 12 |
| Break Condition* | | | | | | | | | | |
| 40° C. | α | α | α | α | α | α | γ | α | α | α |
| 60° C. | α | α | α | α | α | α | γ | α | α | α |
| Heat Durability (°C.) | 110 | 110 | 110 | 110 | 110 | 105 | 56 | 80 | 85 | 90 |
| Break Condition* | β | β | β | β | β | α | γ | α | α | α |

*α: boundary break, β: cohesive failure of backing, γ: cohesive failure of adhesive layer

TABLE 2

|  | Sample No. | | | | | | | |
| --- | --- | --- | --- | --- | --- | --- | --- | --- |
|  | 11 | 12 | 13 | 14 | 15 | 16 | 17 | 18 |
| Initial Tackiness (N/25 mm) | 21.6 | 9.8 | 17.4 | 14.7 | 15.1 | 10.8 | 13.9 | 20.6 |
| Break Condition* | α | α | α | α | α | α | α | γ |
| Adhesive Strength (N/25 mm) | | | | | | | | |
| Stainless Steel | 24.5 | 17.6 | 35.9 | 23.5 | 17.6 | 13.9 | 22.5 | 23.5 |
| Rigid PVC | 24.5 | 20.6 | 35.9 | 39.2 | 23.2 | 24.5 | 29.4 | 24.5 |
| Break Condition* | | | | | | | | |
| Stainless Steel | β | α | β | α | α | α | α | γ |
| Rigid PVC | β | α | β | β | β | β | α | γ |
| Adhesive Strength under Shear (N/cm$^2$) | 46.1 | 149.0 | 81.5 | 78.4 | 117.6 | 113.7 | 133.3 | 53.9 |
| Break Condition* | β | α | β | β | β | α | α | γ |
| Retentivity (hr) | | | | | | | | |
| 40° C. | 24< | 24< | 24< | 24< | 24< | 24< | 24< | 0.2 |
| 60° C. | 19 | 24< | 6 | 5 | 24< | 12 | 3 | 0.1 |
| Break Condition* | | | | | | | | |
| 40° C. | α | α | α | α | α | α | α | γ |

TABLE 2-continued

| | Sample No. | | | | | | | |
|---|---|---|---|---|---|---|---|---|
| | 11 | 12 | 13 | 14 | 15 | 16 | 17 | 18 |
| 60° C. | α | α | α | α | α | α | α | γ |
| Heat Durability (°C.) | 80 | 122 | 75 | 110 | 140 | 100 | 130 | <40 |
| Break Condition* | β | α | β | β | β | α | β | γ |

*α: boundary break, β: cohesive failure of backing, γ: cohesive failure of adhesive layer Sample Nos. 1 and 2 have, respectively, a backing and an adhesive layer both of which were suitably prepared under the preferred conditions for adhesive tape according to the present invention. The results from these samples are excellent in all items. The results of Sample Nos. 3 through 6 each of which includes a change of the present invention also demonstlates excellent adhesive properties.

By contrast, in Sample No. 7, the content of acrylic acid in the adhesive composition is less than those of Sample Nos. 1 and 2. From the results for this sample, it is found that a shortage of free carboxylic acid component causes a decrease in adhesive strength and adhesive strength under shear, while retentivity and heat durability deteriorate drastically as well. Moreover, in all the measurements for Sample No. 7, the break condition illustrates cohesive failure of the adhesive layer, meaning that the cohesive strength of the adhesive layer is not sufficient in spite of the presence of polymer (B) having a hydrolyzable silicon-containing radical. In view of this, it is considered that the polymer (B) cannot work due to shortage of the free carboxylic acid component.

In Sample Nos. 8 and 9, amounts of the polymer (B) having a hydrolyzable silicon-containing radical are changed. In either sample, the results are not suitable. Therefore, it is important to define the amount of added polymer (B) within the preferred range described initially.

The results from Sample No. 10 demonstrates that lack of isocyanate compound in the adhesive composition deteriorates adhesive properties in all the items due to insufficient cohesion.

On the other hand, Sample No. 11 utilizes a polybutadiene backing which has a lower density than those of Sample Nos. 1 and 2. In this sample, initial tackiness is suitable due to flexibility of the backing. However, as shown under adhesive strength, a shortage in the adhesive strength is accompanied by a break caused by cohesive failure of the backing material. This result clearly demonstrates that the backing is insufficient in strength.

In contrast, if the density of the polybutadiene backing material is too high as in Sample No. 12, the backing is short in pliability, and it can, therefore, neither contact fittingly with the adherent surface nor relax sufficiently the stress when it is loaded. Accordingly, initial tackiness and adhesive strength cannot be fully exhibited.

On the other hand, in comparison between the results from Sample Nos. 1 and 13, it can be seen that a closed-cell foam is more preferable than a open cell foam.

Moreover, by comparison with the results from Sample Nos. 14 through 17, it is clear that polybutadiene foam is suitable for pressure-sensitive adhesive tapes more that the other foam materials.

The adhesive composition for Sample No. 18 contains a silanol condensation catalyst. The results of this sample demonstrates that it is rather preferred to use no silanol condensation catalyst in order to impart sufficient initial tack, retentivity, heat durability and adhesive strength to the adhesive composition.

In view of the above, excellent adhesive composition for adhesive tape can be obtained by blending as acrylic copolymer, which contains an appropriate amount of carboxylic acid component, and a polymer containing a hydrolyzable silicon-containing radical at a preferred mixing ratio so that cohesive strength is suitably controlled.

Moreover, if the adhesive composition described above is used for adhesive tape or adhesive sheeting, properties of the adhesive can be efficiently performed especially when the polybutadiene foam which has both pliability and strength is employed as a backing material.

It must be understood that the invention is in no way limited to the above embodiments and that many changes may be brought about therein without departing from the scope of the invention as defined by the appended claims.

What is claimed is:

1. A flexible pressure-sensitive adhesive tape that can bear a shearing force, comprising:
    a sheet backing comprising polybutadiene foam having a substantially closed cell foam structure and having a density within the range of 0.05 to 0.50 g/cm$^3$; and
    a pressure-sensitive adhesive composition on a surface of the sheet backing, the pressure-sensitive adhesive composition comprising:
    (A) an acrylic copolymer prepared from a mixture comprising:
        (i) at least one acrylic ester having an alkyl radical containing, on average, 4 to 12 carbon atoms as an alcohol residue; and
        (ii) polymerizable unsaturated carboxylic acid, wherein the content of the polymerizable unsaturated carboxylic acid is within the range of 5 to 15 parts by weight relative to 55 to 95 parts of the acrylic ester;
    (B) a polymer having a hydrolyzable silicon-containing radical; and
    (C) a polyfunctional isocyanate compound,
        wherein said adhesive composition is free of a silanol condensation catalyst that is used for the condensation of said hydrolyzable silicon-containing radical.

2. The pressure-sensitive adhesive tape of claim 1, wherein a closed-cell ratio of the polybutadiene foam is within a range of 80 to 100% by volume.

3. The pressure-sensitive adhesive tape of claim 1, wherein the polybutadiene foam has a density within the range of 0.10 to 0.30 g/cm$^3$.

4. The pressure-sensitive adhesive tape of claim 1, wherein, relative to 100 parts by weight of acrylic copolymer (A), the content of polymer (B) is within a range of 1 to 50 parts by weight, and the content of the isocyanate compound (C) is within a range of 0.1 to 5 parts by weight, in the adhesive composition.

5. The pressure-sensitive adhesive tape of claim 4, wherein the adhesive composition further comprises:
   not more than 100 parts by weight of tackifier resin (D) relative to 100 parts by weight of acrylic copolymer (A).

6. The pressure-sensitive adhesive tape of claim 1, wherein the alkyl radical as the alcohol residue of the acrylic ester (i) is selected from the group consisting of n-propyl, iso-propyl, n-butyl, sec-butyl, ter-butyl, n-octyl, iso-octyl, 2-ethylhexyl and dodecyl.

7. The pressure-sensitive adhesive tape of claim 1, wherein the polymerizable unsaturated carboxylic acid (ii) is selected from the group consisting of acrylic acid, methacrylic acid, crotonic acid, iso-crotonic acid, itaconic acid, maleic acid and fumaric acid.

8. The pressure-sensitive adhesive tape of claim 1, wherein the mixture for the acrylic copolymer further comprises a component which is selected from the group consisting of methyl acrylate, methyl methacrylate, ethyl acrylate, ethyl methacrylate, stylene, vinyl acetate, acrylonitrile, methacrylonitrile, acrylamide, methacrylamide and vinyl propyonate.

9. The pressure-sensitive adhesive tape of claim 1, wherein the hydrolyzable silicon-containing radical of the polymer (B) is a radical containing a silicon atom which is bonded with an element selected from the group consisting of a hydrogen atom, a halogen atom, an alkoxy radical, an acyloxy radical, a ketoxymate radical, an amino radical, an aminoxy radical, an amide radical, an alkenyloxy radical and a mercapto radical.

10. The pressure-sensitive adhesive tape of claim 1, wherein the polymer (B) has a molecular weight within a range of about 300 to 30,000.

11. The pressure-sensitive adhesive tape of claim 1, wherein the polymer (B) has an alkylene oxide chain.

12. The pressure-sensitive adhesive tape of claim 1, wherein the isocyanate compound (C) is selected from the group consisting of 2,4- and 2,6-tolylene diisocyanate, diphenylmethane-4,4'-diisocyanate, hexamethylene-1,6-diisocyanate, isophorone diisocyanate, hydrogenated diphenylmethane diisocyanate, hydrogenated xylene diisocyanate, lysine trisisocyanate, adduct compounds thereof and a prepolymer having isocyanate terminals.

13. The pressure-sensitive adhesive tape of claim 1, wherein the adhesive composition further comprises:
   tackifier resin (D) selected from the group consisting of rosin ester gum, phenolic resin, xylene resin, xylene phenol resin, terpene phenol resin, aromatic resin, petroleum resin, coumarone-indene resin, low molecular weight polystyrene resin and polyterpene resin.

14. The pressure-sensitive adhesive tape of claim 13, wherein the content of the tackifier resin (D) is not more than 100 parts by weight relative to 100 parts by weight of the acrylic copolymer (A).

15. A pressure-sensitive adhesive tape comprising:
   a sheet backing comprising a polybutadiene foam material; and
   a pressure-sensitive adhesive composition on a surface of the sheet backing, the pressure-sensitive adhesive composition comprising:
   (A) an acrylic copolymer prepared from a mixture comprising:
      (i) at least one acrylic ester having an alkyl radical containing, on average, 4 to 12 carbon atoms as an alcohol residue; and
      (ii) polymerizable unsaturated carboxylic acid, wherein the content of the polymerizable unsaturated carboxylic acid is within a range of 5 to 15 parts by weight relative to 55 to 95 parts of the acrylic ester;
   (B) a polymer having a hydrolyzable silicon-containing radical; and
   (C) a polyfunctional isocyanate compound,
      wherein said adhesive composition is free of a silanol condensation catalyst that is used for the condensation of said hydrolyzable silicon-containing radical.

* * * * *